(No Model.)
F. A. TOURTILLOTTE.
SHAFT BEARING.
No. 593,705.   Patented Nov. 16, 1897.
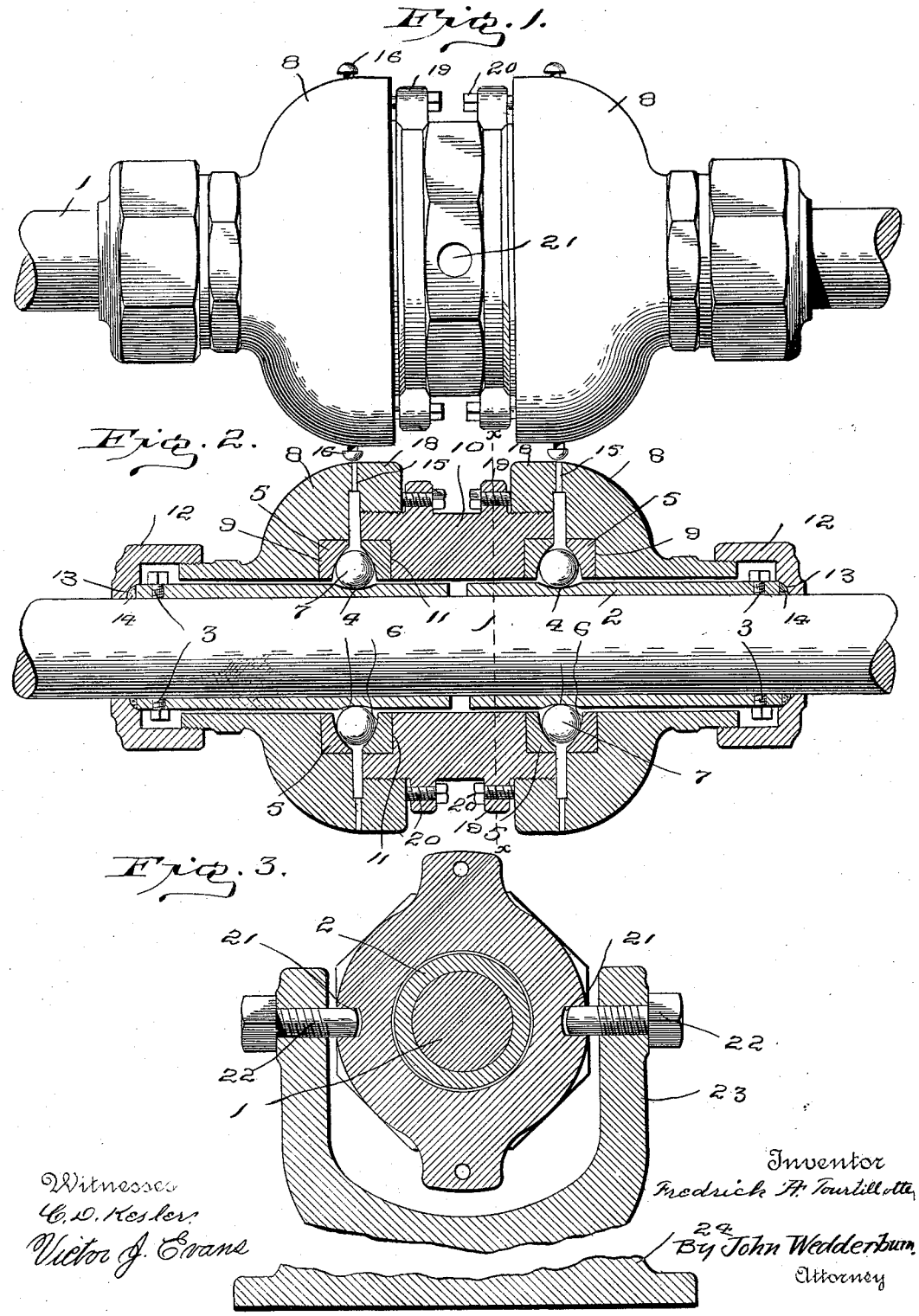

UNITED STATES PATENT OFFICE.

FREDRICK A. TOURTILLOTTE, OF NORTHFIELD, MINNESOTA.

SHAFT-BEARING.

SPECIFICATION forming part of Letters Patent No. 593,705, dated November 16, 1897.

Application filed April 20, 1897. Serial No. 632,937. (No model.)

*To all whom it may concern:*

Be it known that I, FREDRICK A. TOURTILLOTTE, a citizen of the United States, residing at Northfield, in the county of Rice and State of Minnesota, have invented certain new and useful Improvements in Shaft-Bearings; and I do hereby declare the following to be a full, clear, and exact description of the invention, such as will enable others skilled in the art to which it appertains to make and use the same.

This invention relates to shaft-bearings; and it consists of the construction, arrangement, and combination of the several parts, which will be more fully hereinafter described and claimed.

The object of the present invention is to provide a shaft-bearing which can be easily cleaned, adjusted, and wherein the wear upon the shaft itself is prevented and means applied at various points to prevent dripping of the oil or lubricant, the parts being simple and effective in their construction and operation, easily and readily applied, and comparatively inexpensive in the cost of manufacture.

In the accompanying drawings, Figure 1 is a side elevation of a shaft-bearing embodying the invention. Fig. 2 is a central longitudinal vertical section of the same. Fig. 3 is a transverse vertical section on the line *x x*, Fig. 2.

Referring to the drawings, wherein similar numerals of reference are employed to indicate corresponding parts in the several views, the numeral 1 designates a shaft on which are mounted sleeves 2, preferably formed of case-hardened cast-steel and having at opposite ends set-screws 3 for holding the same in proper adjustment on the shaft. To carry out the adjustable features of the bearing, the said sleeves 2 are used in duplicate and oppositely arranged, as clearly shown in Fig. 2, and therein are circumferential grooves 4, over which are positioned rings 5, constructed of case-hardened cast-steel or other suitable material and formed with inner concave walls 6. A series of antifrictional balls 7 are confined between the rings and the grooves in the sleeves 2, and said rings are held partially within hub-collars 8 through the medium of the interiorly-disposed angular recesses 9 and partially in the main hub 10, also formed with recesses 11 at its opposite inner portions similar in construction to the recesses 9. The hub-collars 8 have outer reduced portions or flanges which are exteriorly screw-threaded and engaged by end collars 12, having inwardly-projecting flanges and snugly surrounding the shaft 1, and annular recesses 13 being formed therein for the purpose of holding a quantity of hemp packing 14 against the outer ends of the sleeves 2. This hemp packing 14 is wound around the shaft and prevents the passage of oil outwardly through the collars 12. The hub-collars 8 are also constructed with drain or clean-out holes 15, communicating with similar openings in the rings 5, and receive closing-plugs 16. Adjacent to these clean-out openings the hub-collars also have inwardly-extending flanges 18, which are interiorly screw-threaded and engage similar surfaces on the outer adjacent portions of the hub 10 at opposite ends of the latter. The said hub is also formed with a pair of outwardly-projecting ears 19 on opposite sides thereof, in which are mounted adjusting-screws 20, the outer faces of the said ears standing a short distance from the inner terminations of the flanges 18 of the said hub-collars, and the ends of the said set-screws 20, carried by the ears 19, bear against the said inner terminations of the said flanges and lock the said hub-collars in their adjusted positions. The said hub-collars are adapted to take up the space in lengthening or shortening the parts of the bearing when it is found necessary to so change the parts of the device. On opposite sides of the main hub 10 are apertures 21 to receive center bolts 22, adjustably supported by arms 23, extending upwardly from a stand or bearing support 24. This construction permits the bearing as an entirety to be oscillated and adjust itself to the shaft and thereby compensate for settling, which often occurs in mills. This feature is also especially advantageous in connection with shafting used in roller-mills.

By the construction and arrangement of parts heretofore set forth a material reduction in frictional contact of the bearing is attained and all the parts of the bearing, except the sleeves 2, rings 5, and antifrictional balls 7, can be made of ordinary cast metal. Of course the said sleeves, rings, and balls are to be constructed of case-hardened material to resist wear thereon, the said sleeves protecting the shaft and rotating therewith, as will be readily understood. It will also be seen that openings are provided for oiling the antifrictional balls, which are exceptionally convenient, as will be understood by those skilled in the art.

It is obviously apparent that many minor changes in the details of construction and arrangement of the several parts might be made and substituted for those shown and described without in the least departing from the nature or spirit of the invention.

Having thus described the invention, what is claimed as new is—

In a shaft-bearing, the combination with a shaft, of sleeves surrounding the same having grooves therein, a main hub mounted over said sleeves, hub-collars engaging the said main hub at opposite sides and locked in connection therewith, rings carried by the said main hub and hub-collars, antifrictional balls mounted between the said rings and sleeves, center bolts attached to opposite sides of the main hub to permit the entire bearing to oscillate, and opposite end collars engaging the hub-collars and inclosing a winding or packing against the outer ends of the sleeves on the shaft, substantially as and for the purposes specified.

In testimony whereof I have signed this specification in the presence of two subscribing witnesses.

FREDRICK A. TOURTILLOTTE.

Witnesses:
C. W. PYE,
C. HALL.